Sept. 21, 1943.     A. W. MARBURG     2,330,130
PRESSURE SEALED JOINT
Filed June 19, 1941     2 Sheets-Sheet 1
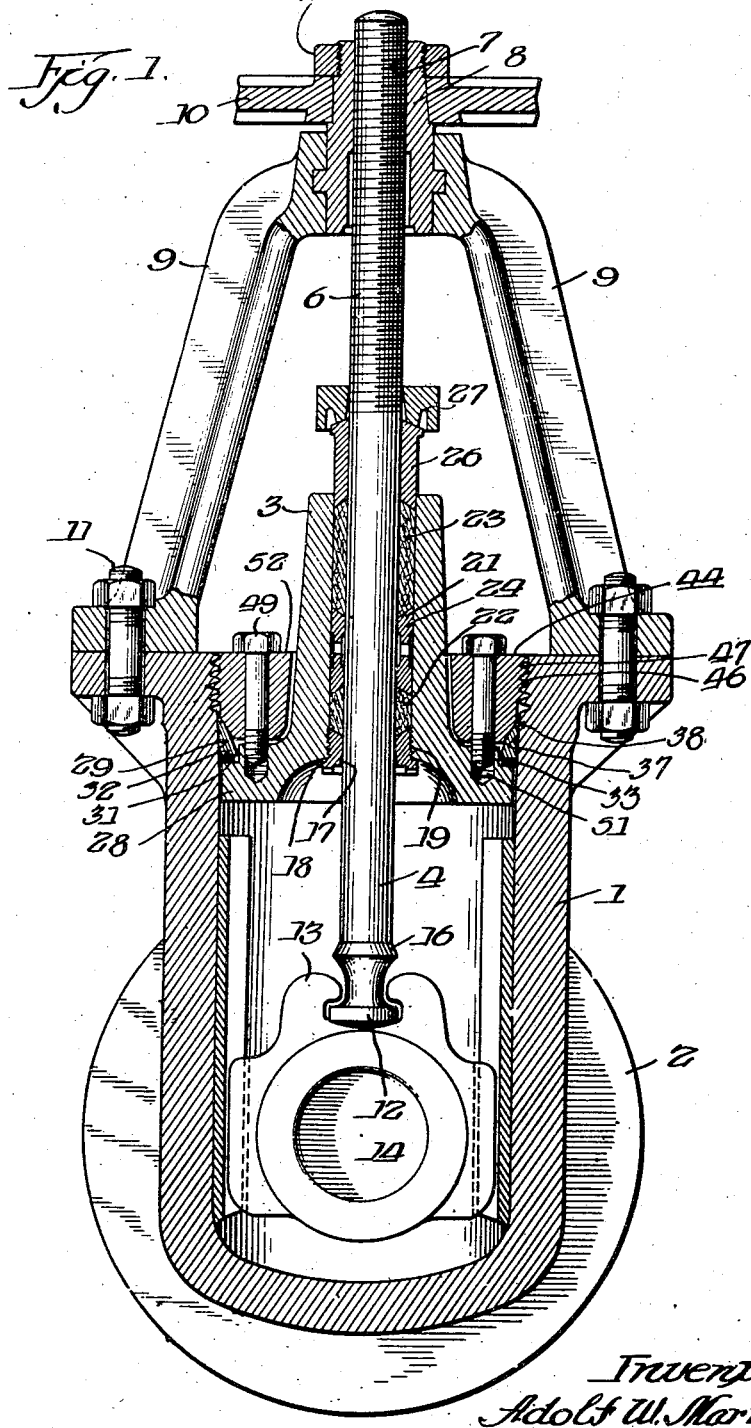
Inventor:
Adolf W. Marburg
By: Joseph O. Lange Atty.

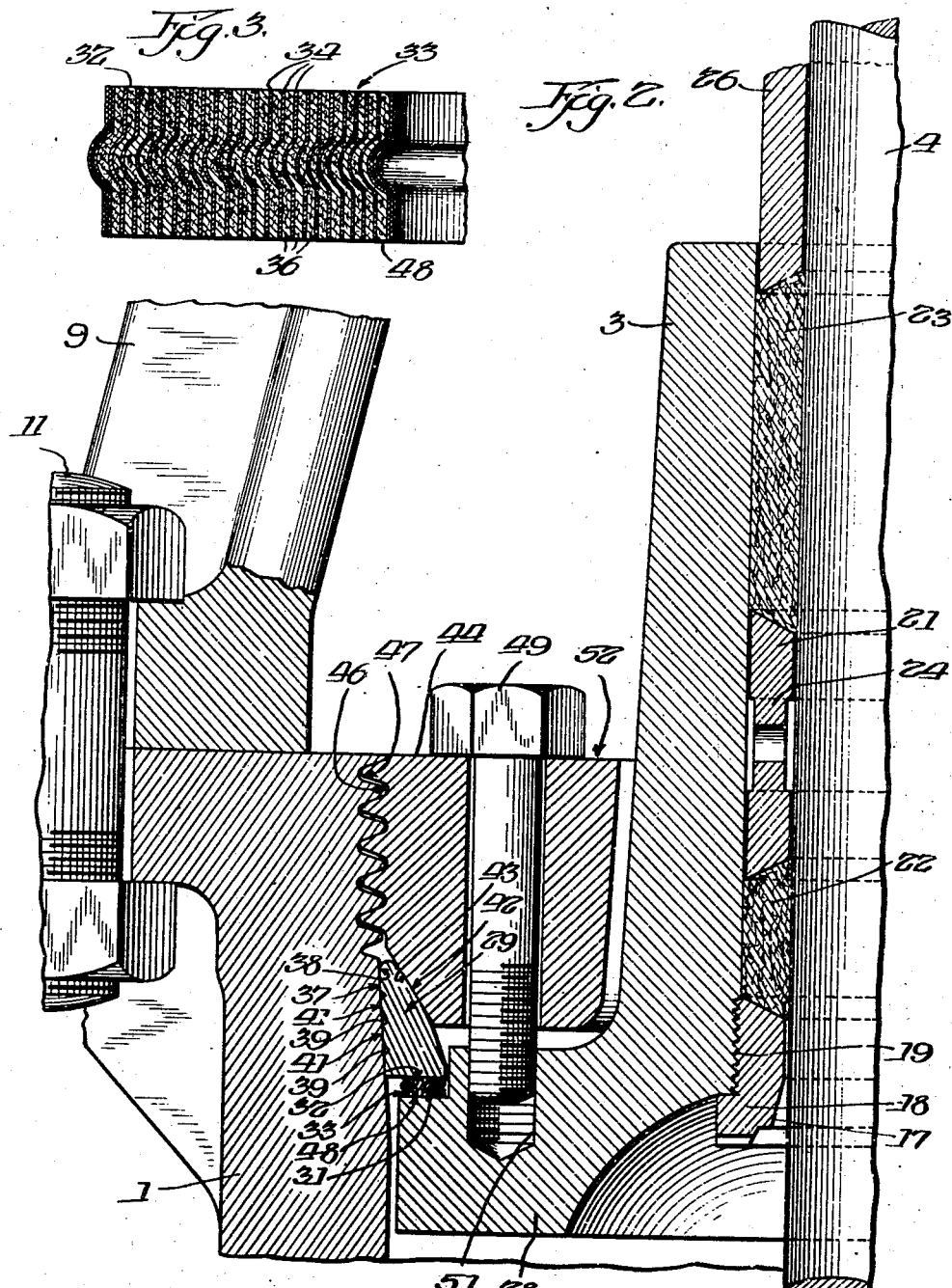

Patented Sept. 21, 1943

2,330,130

UNITED STATES PATENT OFFICE 2,330,130

PRESSURE SEALED JOINT

Adolf W. Marburg, Chicago, Ill., assignor to Crane Co., Chicago, Ill., a corporation of Illinois Application June 19, 1941, Serial No. 398,736

4 Claims. (Cl. 220—46)

My invention relates to an improved type of closure for pressure vessels, the term "closure" being broadly used in the sense that it includes inspection and cleanout plates for autoclaves and similar high pressure and high temperature equipment, valve bonnets, and other vessels in which pressure must be maintained. The structure herein disclosed is an improvement and a further development over that disclosed in the Marburg et al. pending patent application, of which I am co-inventor, Serial No. 388,784 filed April 16, 1941, now Patent No. 2,305,590, dated Dec. 22, 1942. More particularly, my invention relates to a novel bonnet joint or closure for a valve, fitting or other pressure vessel in which such a pressure sealing joint may be used to significant advantage, especially considering the constantly increasing pressures which are being encountered in normal power plant, oil refinery, and like services.

It is well accepted that the great majority of present-day pressure vessels are constructed with joints and closures least conducive to effecting an efficient fluid seal for the reason that the line pressure is normally opposed to the fluid seal so that it tends to spread the sealing surfaces apart with resulting line leakage tending to occur between them. This is especially true in connection with valves and related pipe fittings and for this reason my invention has been illustrated herein in connection with a valve. Obviously this is meant to be only by way of illustration or example and not by way of limitation in the possible application of my invention. Well known everyday examples of such joints in which the pressure tends to work against the fluid seal are the commonly used threaded joints, flanged joints with many different facings, ball joints, and the like which are equally well known to those who are skilled in the art.

Another inherent disadvantage of these commonly used joints is their inability to remain in fluid-tight condition during sudden temperature changes. An example of service where such a sudden temperature change is frequently encountered is in a power plant using superheated steam, the temperature differential between the various parts of the joint being produced when meeting additional power requirements by bringing an additional boiler onto the steam line; the later introduced boiler cuts in at substantially saturated steam temperature which is usually several hundred degrees below the normal superheat operating temperature. This connection of the supplemental boiler results in sudden contraction of such surfaces of the piping system which are in direct communication with the relatively cooler subsequently-introduced line fluid. As a result, high stress variations are set up within the various component parts and momentary warpage of normally abutting sealing surfaces causes them to spread apart momentarily, and leak, until thermal equilibrium is re-established. This leakage, even if occurring only slightly each time the pressure system is quenched in the manner described, takes place at very high velocity and leads to a serious erosion of these sealing surfaces so that ultimately they may leak, even under the relatively more favorable constant temperature condition. Another example of such quenching service, which may be referred to briefly, occurs also in certain oil refining processes where valves and fittings may normally be used at 1100 degrees Fahrenheit but at a certain point in the refining cycle it is necessary to instantaneously replace the 1100 degree fluid by another at 850 degrees.

While there are literally thousands of different joints on the market and disclosed in the literature including prior patents, only relatively few of these have utilized the internal or line pressure to effect a fluid seal which may be regarded as even approaching commercial acceptance. After a thorough review of the market and a comprehensive investigation of the literature as stated, I have personally tested the best pressure sealed joints known to the art, or modifications of them, and have found that not a single one will remain absolutely pressure tight on such sudden temperature changes as described. The lack of a satisfactory joint for this service can probably be explained by the fact that this quenching or sudden temperature change is a relatively recent practice with the users of industrial piping, valves, and fittings.

It is therefore a principal purpose herein to provide a novel and practical means of constructing a closure for pressure vessels which is relatively light in weight, avoiding the usual heavy flanges, and which is also economical to manufacture, being easily utilized on high pressures and high temperatures, with the avoidance of leakage even when the service conditions encountered are substantially variable. A further advantage of my invention is that the construction may be readily assembled before use and disassembled after use in a relatively shorter time than with previously known joints and with a substantial reduction in the manual effort required.

Another purpose of my invention is the provision of a fluid sealing joint for a pressure vessel which will remain fluid tight even under a condition of widely fluctuating temperatures.

Still another purpose lies in the provision of a pressure tight joint which requires no periodical retightening of bolt studs or the usual attention of frequent adjustment or inspection after the initial assembly has been completed.

A further object lies in the provision of a joint for pressure vessels in which the reactive forces within the joint are employed to positively maintain a fluid seal even under widely varying conditions of temperature and pressure.

Another purpose is the provision of resilient means in combination with the gasket of a pressure sealing joint for the purpose of elastically storing sealing stresses in such a manner that the component parts of the joint do not readily loosen in service at very moderate pressures.

Another object of my device is the provision of a fluid sealed gasketed joint which is readily dismantleable by reason of the fact that a resilient member is utilized to maintain the fluid sealing surfaces in yieldable or movable abutment with one another, and the fact that the removal force may be applied to the joint substantially parallel to the axis of the assembly.

Another purpose of my invention is the provision of a pressure sealed joint having a gasket whose dimensional changes are tardily respondent to sudden temperature changes of the fluid within the joint by reason of the fact that a layer of insulating material is interposed between the gasket and the fluid.

Another object of my invention lies in the provision of a fluid sealing joint for pressure vessels having means in direct contact with the joint gasket which serves to decrease the heat transfer from the main body of the fluid to the gasket and those parts of the joint immediately adjacent to the gasket.

Another object is the provision of threaded back-up means adapted to maintain a fluid sealed joint in position, the threads being substantially rounded at their edges whereby stress concentration is decreased and the necessary axial length of the cooperating threaded members is correspondingly decreased.

A still further object of my invention is the provision of a gasketed closure joint for a valve casing or the like having initial tightening means serving to compress a relatively resilient member against the gasket, the energy that is stored up within the compressed resilient material being available to maintain the initial tightening means under stress at all times, and further, as a consequence of this, serving to maintain the fluid sealing surfaces in forcible contact at all times.

Another object of my invention is the provision for a pressure vessel joint of a compound gasket consisting of two members, the first member being of relatively hard material and carrying a fluid sealing surface abutting the pressure vessel casing, the second member being of resilient insulating material which is relatively softer than the first member, the second or softer member serving a three-fold purpose; first, upon compression thereof energy is thereby stored within this second member in such a manner as to urge the first member into fluid sealing contact with the casing at all times; second, the gasket-casing seal referred to is rendered tardily respondent and substantially independent of sudden temperature changes within the pressure vessel; and, third, the softer member forms an effective seal against leakage across its surfaces.

Having generally described certain purposes and advantages of my invention, a more detailed explanation is given in connection with one form of my device as illustrated in the accompanying drawings, in which Fig. 1 shows one form of my invention as it may be employed in the body-bonnet joint for a high pressure gate valve.

Fig. 2 is an enlarged fragmentary section of the joint itself.

Fig. 3 is a magnified fragmentary view of the gasket employed in combination.

Like parts are designated by the same reference characters in all figures in the drawings.

Referring to Fig. 1, for purposes of illustration only, a conventional valve is shown in connection with my present invention, the type of valve being known to those skilled in the art as a solid wedge disc gate valve. The valve comprises in general the usual parts consisting of a body or casing 1 having ports or passages therethrough which are provided with means for connecting into a pipeline, for instance the flanges 2 (only one of which is shown) which are drilled for bolting (bolt holes not shown). The bonnet member generally designated 3 is connected to the casing 1 by means of my novel pressure sealed type of joint hereinafter to be described in detail. A stem 4, having formed at its upper end the screw threads 6 which are engaged with like threads 7 formed in a rotatable yoke sleeve 8, is adapted to move axially on relative rotation of the yoke sleeve 8 by means of a handwheel or operating lever 10 which is suitably connected thereto and held in place by the wheel nut 20. The yoke sleeve 8 is thus rotatably supported by means of the individual yoke members 9 which are bolted together at the upper end by means of the usual bolts (not shown) and are fastened directly to the body 1 by means of the bolts 11. This manner of attaching the yoke members is similar to that novel method disclosed in the Stark et al. pending patent application, Serial No. 377,136 filed February 3, 1941. If the conventional method were employed with a pressure sealing joint, that is by supporting the stem directly by the bonnet, it would have a serious drawback for, in raising the disc from a fully seated position, a tremendous downward force would be applied on the bonnet, possibly sufficient in some cases to break the seal or joint and cause line fluid to leak past the gasket member. The novel method disclosed in the application referred to for attaching the yoke is therefore preferred because it prevents application of longitudinal loads to the bonnet which would counteract or minimize the pressure load required to maintain a tight joint. Further, it allows the bonnet 3 to "breathe" or to move slightly axially under the varying internal pressures and to thereby maintain a fluid-tight seal at all times between the bonnet and the body.

The lowermost end of the stem 4 is provided wtih a conventional T head 12 for engagement with jaws or hook portions 13 of the solid wedge disc or the closure member 14, the latter member being adapted to contact seating surfaces in the casing 1 for the purpose of interrupting or stopping the flow of fluid through the valve. The stem 4 is preferably provided with a frusto-conical back-seating surface 16 which is adapted to seat a similarly shaped surface 17 in the back-seating bushing 18 which is threaded upwardly and shouldered into the bonnet 3 by means of the threads 19. When the stem is moved upward to the limit of its travel, the abutment of the surfaces 16 and 17 causes the packing chamber, generally designated 21, to be effectively sealed from the interior of the valve, thus allowing the packing 22 or 23, or the packing spacer 24 to be replaced or repaired without taking the valve from service. A cylindrical packing gland 26 has its lower end portion inserted into the packing chamber 21 and is adapted to compress the packing 23 by the downward movement of the gland follower member 27, the latter being movable downwardly by any suitable means as, for instance, by vertical bolts (not shown) connecting the gland follower 27 to the bonnet 3 in the usual manner.

Referring now more particularly and in detail to my novel, improved pressure sealing joint per se, the bonnet or dome 3 has formed at its lowermost end a flange portion 28. A gasket ring 29 of approximately triangular cross-section has its lower surface 31 normally in forcible abutment with the upper surface 32 of a relatively softer gasket member 33 which is fitted into an annular chamber bounded by the casing 1, the gasket ring 29, and the bonnet flange 28. Preferably, the lower surface 31 of the gasket member 29 is at right angles to the axis of the bonnet as shown, but substantial variations from this preferred right angle may be employed with advantageous results approaching those secured with the construction shown. The gasket member 33, as shown in greater detail in Fig. 3, is constructed in a manner which I have found gives very favorable results when used in combination with other elements of my device which will hereinafter be described. The member 33 comprises alternate concentric laminations 34 of metal and 36 of asbestos or the like, the metal laminations serving as resilient supporting means and the asbestos serving as heat insulating means. The resilience or elasticity of the member 33 may be very favorably enhanced also by constructing the individual laminations 34 and 36 of a modified U-shaped cross-section, as shown. However, it is not desired to be limited to this specific construction of the member 33, for any insulating material capable of resisting substantial plastic deformation at whatever temperature the valve is to be subjected would be suitable. The modification shown was constructed entirely of high heat resistant material for relatively high temperature service, say approximately 1000 degrees Fahrenheit. Obviously, if the valve is to be used at a lower temperature, some other material may be equally satisfactory. Whatever material is used, it should preferably possess two qualities in particular, namely: (1) heat insulating ability, and (2) resilience. The necessity for this first requisite will be explained subsequently in further detail.

The outer surface 37 of the gasket 29 is of upwardly or outwardly enlarging frusto-conical form and abuts a similarly formed surface 38 in the casing. The bearing load between the casing surface 38 and the gasket surface 37 may be increased if the latter is formed with a series of grooves 39 which include therebetween a number of peripheral gasket sealing surfaces 41; obviously, these grooves may be formed in the casing surface 38 itself and achieve the same result. The inner surface 42 of the gasket 29 abuts the upwardly or outwardly enlarging tapered surface 43 on the back-up ring or bonnet-supporting member 44 which is maintained within the casing 1 by means of the coarse screw threads 46 and 47 formed on the back-up ring 44 and within the casing 1, respectively. These screw threads are preferably formed with rounded crests and valleys in order to minimize stress concentrations and to promote increased strength per unit of threaded length. These screw threads 46 and 47 are preferably formed continuous about the respective peripheries of the casing and the back-up member 44 whereby the two are assembled by the continuous rotation of the one with respect to the other. Alternately, it is apparent that these threads may be made discontinuous or circumferentially interrupted in a breech-lock manner whereby the rapid assembly of the joint may be carried out simply by mating the threaded peripheral segments of the one member with the unthreaded peripheral segments of the other, then moving the back-up ring axially the desired distance into the casing and rotating to interlock the threads.

To assemble such a valve as I have illustrated, the casing 1 is conveniently, but not necessarily, placed in an upright position and the bonnet assembly including the stem 4, the disc 14, the packing, etc., is lowered into the casing; the gasket members 33 and 29 are then lowered into the annular space between the casing and the bonnet, the member 29 resting upon the tapered surface 38 formed within the casing 1; the back-up ring 44 is then screwed snugly down upon the gasket ring 29, and the flange 28 of the bonnet 3 is then drawn snugly up against the lower face 48 of the gasket member 33 by means of a number of cap screws 49 which extend through the back-up ring 44 and into holes 51 drilled and tapped in the bonnet flange 28. To complete the assembly of the valve, the yoke sleeve 8 with a handwheel 10 attached by a wheel nut 20 is threaded onto the upper part of the stem 4 and then the individual yoke members 9 are bolted onto the casing 1, forming a direct connection between the yoke sleeve and the body or casing.

The gasket member 33 is given a certain amount of initial compression by the cap screws 49, causing it to exert continual upward force upon the gasket ring 29 whereby the fluid-sealing surfaces 37 and 38 of the gasket and casing, and the fluid-sealing surfaces 31 and 32 of the members 29 and 33 are continually urged into pressure-tight contact. Pressure-sealed joints heretofore known have lacked a resilient insulating member such as 33 in combination with a cooperating sealing member such as 29. As already indicated, the function of the member 33 is threefold: one function being to provide means for retaining bolt loads on the cap screws 49 in the event of slight axial movement of the bonnet flange 28 with respect to the back-up ring 44, as I have found to be normally the case when the valve is subjected to widely fluctuating temperatures and pressures; a second very important function of the member 33 is to insulate the gasket member 29 from the effect of rapidly changing temperature conditions which may prevail in the bonnet 3, as for instance under the quenching service conditions already described; and, third, to effect a seal between the gasket member 29 and the bonnet flange 28.

In actual operation, the cap screws 49 serve to limit the downward movement of the bonnet with respect to the casing and also at the outset provide some degree of initial tightness to the fluid-sealing contacting surfaces. The cap screws need not be large and usually three or four in number are quite sufficient since their main purposes are to hold the named units together when there is no pressure within the valve and also to provide some degree of initial compression to the resilient insulating member 33 in order to achieve fluid tightness at very low line pressures. Any other suitable means however may be utilized for limiting the downward movement of the bonnet, for example, a large nut may be provided threadedly engaging the upper outside portion of the bonnet 3 and bearing downwardly upon the upper surface 52 of the back-up ring (this modification not shown). Just as soon as substantial line pressure has been allowed to act upon the inner surface of the bonnet 3 the latter member is forced upwardly upon the gasket member 33 which in turn transmits the force to the gasket member 29, thereby moving the gasket members 33 and 29 and the gasket member 29 and the casing into even more effective fluid-sealing contact, such increased contact being maintained until the pressure is again relieved from the valve at which time the cap screws 49 will again assume the support of the bonnet 3, the forces of compression stored up within the gasket member 33 functioning to urge the bonnet inwardly in opposition to the support of the cap screws 49 thereby maintaining all parts of my novel gasket joint tightly together even in the event of a total release of pressure from the valve body and keeping the joint tightly sealed against even the lowest fluid pressures. It will therefore be apparent that the cap screws 49 might actually be removed as long as the pressure is maintained, without in any way affecting the tightness of the joint, since line pressure within the casing is sufficient alone to maintain joint tightness at elevated pressures.

I prefer to make the gasket member 29 of a material which resists substantial permanent deformation at high temperatures and high internal valve pressures. For example, I have had satisfactory results with a number of materials possessing high moduli of elasticity and high compressive strengths, such as ordinary steel and steel alloys. Likewise, advantageous results have also been obtained with hard gasket materials which have low moduli of elasticity combined with high compressive strengths, such as cast iron for example.

In the light of tests performed on experimental samples of my novel joint, it has definitely been ascertained that it will not leak on a sudden temperature change as great as 790 degrees Fahrenheit. For instances, I have heated the bonnet joint of a four-inch valve, which is approximately equivalent to an eight-inch line joint, to a temperature of 850 degrees by means of superheated steam flowing within it, and have discharged the superheated steam and rapidly introduced cold tap water at approximately 200 pounds per square inch and 60 degrees Fahrenheit before the valve body had a chance to cool. This test was so severe that the inlet and outlet pipe lines, which were connected by ordinary threaded and union joints, leaked severely from every joint during the transition stage while the temperature of the line was dropping from 850 degrees to 60 degrees, and continued so to leak until temperature equilibrium was substantially re-established at 60 degrees, but at no time before, during or after this transition stage did the joint made as herein disclosed tend to leak or "spit." This test was repeated more than a dozen times without any evidence of leakage through the tested joint. This joint could be assembled or disassembled by one man in about three minutes as contrasted with the conventional bolted, flanged, ring joint of comparable size which requires the labor of two men for an hour to an hour and a half to assemble and the labor of two men for approximately half an hour to disassemble.

The behavior of my joint as illustrated in connection with the structure shown in Figs. 1 and 2, is briefly as follows: Assume that the valve is installed in a suitable pipeline, for instance on the oil refinery service above mentioned. Fluid pressure acting on the lower area or undersurface of the flange 28 of the bonnet 3 will cause it to be maintained upward against the gasket member 33 which in turn transmits the force to the gasket member 29. The force resulting from the application of internal pressure to the bonnet is of course equal to the pressure times the area, and a substantial proportion of this pressure is transmitted through the gasket 29 directly to the tapered surface 43 on the back-up ring 44; it is apparent that only a small proportion of this pressure force is transmitted directly to the casing surface 38. By reason of the taper of the surface 43, a reaction component of the pressure is directed outwardly and downwardly and serves to press the outside surface 37 of the gasket into fluid-sealing abutment with the casing surface 38. It is obvious, then, that fluctuating temperatures cannot break the fluid seal between the surfaces 31 and 32 and between the surfaces 37 and 38 since the gasket ring 29 is entirely out of contact with the fluid stream and is very effectively insulated from the bonnet 3. The latter member is subject to varying temperatures as the temperature of the fluid changes. Consequently there will be no relative radial deformation of the back-up ring surface 43 or of the gasket member 29 and therefore the reaction component of the pressure which acts to produce the seal between the surfaces 37 and 38 of the gasket and of the casing, respectively, will remain undisturbed. This manner of effecting a sealing surface on the casing itself is similar to that novel method disclosed in the aforesaid Marburg et al. pending patent application.

While my disclosure herein has been particularly concerned with valves in which my joint is employed it should nevertheless be obvious that it is equally applicable to a valve without a stem or to any kind of a pressure vessel in which access to the interior thereof must be provided without the necessity of cutting a welded joint or otherwise destroying or permanently modifying a part of the structure. Accordingly, I desire to be limited only within the spirit of the appended claims.

I claim:

1. A joint for a pressure vessel comprising a casing having an opening therein, an axially movable dome member within the said opening, back-up means fixed within the said opening, the said casing having an inner, upwardly enlarging tapered surface, the said back-up means having an upwardly enlarging tapered surface in substantial planar alignment with the said tapered surface of the casing, the said dome member having an upwardly facing surface, the respective casing, back-up means and dome surfaces including therebetween an annular gasket chamber, a gasket member positioned within the said gasket chamber and annularly abutting the respective surfaces of the said casing and back-up means, resilient insulating means interposed between the said gasket member and the said dome member, means independent of the fluid pressure for urging said dome upwardly and thereby effecting compression of said gasket member and said resilient insulating means, whereby the fluid sealing surfaces of said joint are maintained in fluid-tight relation irrespective of substantial fluid temperature and pressure changes within the pressure vessel.

2. A joint for a pressure vessel comprising a casing having an opening therein, a movable closure member within the said opening, back-up means fixedly mounted within the said opening and adapted by interlocking means to limit the movement of the said closure member, the interlocking means of said back-up means having rounded surface elevations and depressions, the said casing and the said back-up means having annular tapered surfaces, the said casing, back-up means and an upper surface of said closure member forming the walls of an annular gasket chamber, gasket means within said gasket chamber, resilient, insulating means within the said gasket chamber interposed between said gasket means and said closure member, whereby a limitedly yieldable load is maintained upon said gasket means and whereby said gasket means is insulated from the warpage-inducing effects of fluctuating temperatures within the pressure vessel.

3. A joint for a pressure vessel comprising a casing having an opening therein, a movable closure member within said opening, back-up means fixed within the said opening outside of said closure member, the said casing and the said back-up means having outwardly expanding frusto-conical surfaces, said closure member having an outwardly facing surface, the said frusto-conical surfaces and said closure member surface forming the walls of an annular gasket chamber, gasket means interposed within said chamber consisting of a plurality of members, the first member being of relatively hard material, the second member being relatively soft, resilient and possessing a low rate of heat transfer, the said second member being adapted to insulate the said first member thermally from the said closure member, whereby the said gasket means is maintained substantially independent of fluid temperature fluctuations within the pressure vessel.

4. A joint for a pressure vessel comprising a casing having an opening therein, a movable closure member within said opening, back-up means fixed within the said opening outside of the said closure member, the said casing having an outwardly expanding frusto-conical surface on its inner wall, the said back-up means having an outwardly expanding frusto-conical surface substantially concentric with said frusto-conical surface of the casing, the said closure member having an outwardly facing surface, the said casing, back-up means and closure member surfaces defining an annular gasket chamber, a gasket member of wedge shape cross-section positioned within the said gasket chamber and having a pair of surfaces abutting the respective walls of the said casing and the back-up means, annularly disposed insulating means between a third surface of said gasket member and said outwardly facing closure member surface, means independent of the fluid pressure for urging the said closure member outwardly and effecting compression of said gasket member and said resilient insulating means, whereby the said gasket member is maintained in substantial forced abutment with said back-up means and in fluid-sealing contact with the said casing and said resilient means irrespective of substantial and rapid temperature changes of fluid within the pressure vessel.

ADOLF W. MARBURG.